US011829910B1

(12) United States Patent
Tsur et al.

(10) Patent No.: US 11,829,910 B1
(45) Date of Patent: *Nov. 28, 2023

(54) SYSTEMS AND METHODS FOR MATCHING TRANSPORTATION REQUESTS OVER EXTENDED BATCHING WINDOWS

(71) Applicant: Lyft, Inc., San Francisco, CA (US)

(72) Inventors: Orit Balicer Tsur, Palo Alto, CA (US); Vincent Chih-jye Chang, San Francisco, CA (US); Dor Levi, San Francisco, CA (US); Molly Angelica Ingles Lorenzo, San Francisco, CA (US); Keshav Eva Klementine Puranmalka, Seattle, WA (US); Krishna Kumar Selvam, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,933

(22) Filed: Mar. 7, 2023

Related U.S. Application Data

(63) Continuation of application No. 16/024,349, filed on Jun. 29, 2018, now Pat. No. 11,625,652.

(51) Int. Cl.
*G06Q 10/0631* (2023.01)
(52) U.S. Cl.
CPC ..... *G06Q 10/0631* (2013.01); *G06Q 2240/00* (2013.01)
(58) Field of Classification Search
None
See application file for complete search history.

(56) References Cited

U.S. PATENT DOCUMENTS

| 2008/0114629 A1* | 5/2008 | Pavlov | G06Q 50/30 705/347 |
| 2018/0231984 A1* | 8/2018 | Alonso-Mora | G06Q 10/0631 |
| 2020/0058044 A1* | 2/2020 | Deng | G06Q 10/02 |

FOREIGN PATENT DOCUMENTS

| WO | WO-2018208232 A1 * | 11/2018 | ............. G06Q 10/02 |

OTHER PUBLICATIONS

Furahata et al.; "Ridesharing: The state-of-the-art and future directions"; Nov. 2013; Elsevier; Transportation Research Part B; pp. 28-46 (Year: 2013).*

\* cited by examiner

*Primary Examiner* — Omar Zeroual
*Assistant Examiner* — Jorge G Del Toro-Ortega
(74) *Attorney, Agent, or Firm* — Greenberg Traurig, LLP

(57) ABSTRACT

The disclosed computer-implemented method may include matching transportation requests. By collecting and batching match requests over an extended period, a dynamic transportation matching system may identify more efficient matches (e.g., may match transportation requests with greater overlaps). In addition, by dynamically setting and/or extending the upper bound of time that a transportation request may remain batched with other transportation requests, the dynamic transportation matching system may account for contextual information thereby situationally improving matching efficiencies made possible with higher upper bounds while avoiding requestor dissatisfaction, lost conversions, or other inefficiencies that may result from upper bounds that are too high. Furthermore, by providing a notification interface for a transportation requestor device that notifies the requestor when to be ready, a transportation matching application may provide a positive requestor experience while allowing for longer match windows. Various (Continued)

other methods, systems, and computer-readable media are also disclosed.

20 Claims, 12 Drawing Sheets

Method 1000

```
┌─────────────────────────────────────────────────────────────────────────────┐
│ Receive, by a dynamic transportation matching system, a first transport      │
│ request and a second transport request                                       │
│                                   1010                                       │
└─────────────────────────────────────────────────────────────────────────────┘
                                      ↓
┌─────────────────────────────────────────────────────────────────────────────┐
│ Enter the first transport request and the second transport request into a   │
│ batch of transport requests                                                  │
│                                   1020                                       │
└─────────────────────────────────────────────────────────────────────────────┘
                                      ↓
┌─────────────────────────────────────────────────────────────────────────────┐
│ Evaluate, by the dynamic transportation matching system, a fitness of        │
│ matching the first transport request with a second transport request to be   │
│ fulfilled by a shared transport provider, based at least in part on a        │
│ transportation overlap between the first transport request and the second    │
│ transport request when fulfilled by the shared transport provider            │
│                                   1030                                       │
└─────────────────────────────────────────────────────────────────────────────┘
                                      ↓
┌─────────────────────────────────────────────────────────────────────────────┐
│ Determine, based at least in part on a characteristic of the first transport │
│ request, an upper bound for an amount of time to monitor changes within the  │
│ batch of transport requests for potential alternative matchings involving    │
│ the first transport request with a greater fitness than the fitness of       │
│ matching the first transport request with the second transport request      │
│                                   1040                                       │
└─────────────────────────────────────────────────────────────────────────────┘
                                      ↓
┌─────────────────────────────────────────────────────────────────────────────┐
│ Match the first transport request with the second transport request based   │
│ at least in part on the fitness of matching the first transport request     │
│ with the second transport request and based at least in part on the upper   │
│ bound for the amount of time to monitor changes within the batch of         │
│ transport requests                                                           │
│                                   1050                                       │
└─────────────────────────────────────────────────────────────────────────────┘
```

*FIG. 10*

SYSTEMS AND METHODS FOR MATCHING TRANSPORTATION REQUESTS OVER EXTENDED BATCHING WINDOWS

CROSS REFERENCE TO RELATED APPLICATION

This application is a continuation of Ser. No. 16/024,349, filed Jun. 29, 2018, the disclosure of which is incorporated, in its entirety, by this reference.

BACKGROUND

Some transportation services may provide transportation on demand, drawing from a transportation supply pool to meet the needs of those requesting transportation as the needs arise. However, fulfilling requests by arbitrarily matching available transportation supply units with pending transportation requests may result in wasted transportation supply resources, inefficient transportation routes, or other suboptimal results. For example, a transportation service may fulfill multiple transportation requests with the same transportation supply unit by identifying a transportation route with overlap between the transportation needs of the multiple transportation requests, thereby potentially achieving greater transportation efficiency.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 10 is a flow diagram of an example method for matching transportation requests over extended batching windows.

Figure 1:
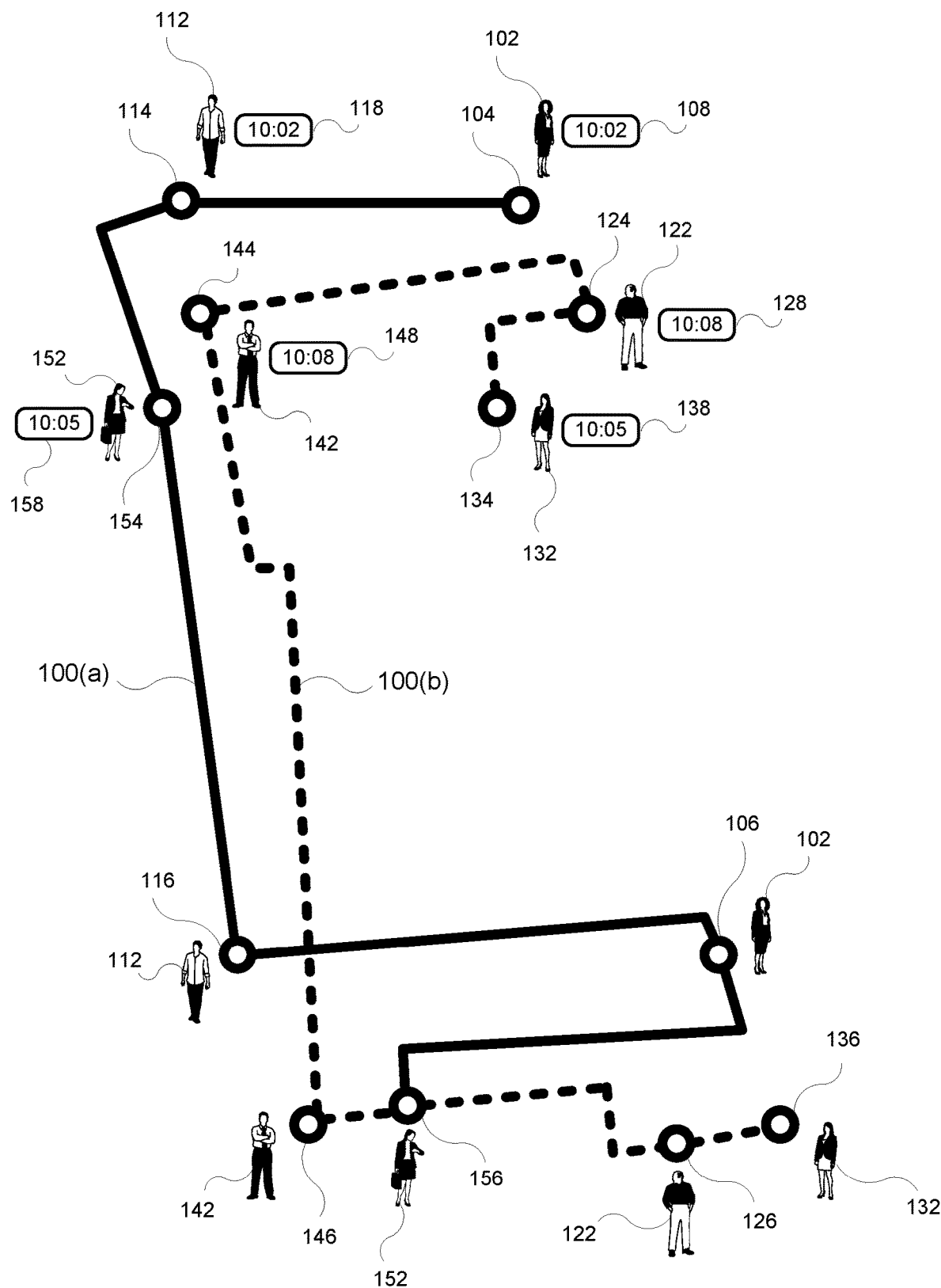
FIG. 1 is an illustration of example dynamic transportation matches.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to matching transportation requests (e.g., requests submitted to a dynamic transportation matching system) over extended batching windows. Real-time matching decisions between transportation requestors and/or transportation providers may pose tradeoffs when the future is uncertain. For example, matching multiple requests may produce global cost savings when a single provider provides rides to multiple requestors with overlapping travel needs. However, committing to an initial match that produces mediocre cost savings may preclude a superior match made possible by a later, newly submitted ride request.

By collecting and batching match requests over an extended period (e.g., 2 minutes or more), a dynamic transportation matching system may identify more efficient matches (e.g., may match transportation requests with greater overlaps). In addition, in some examples, by dynamically setting and/or extending the upper bound of time that a transportation request may remain batched with other transportation requests (before, e.g., committing the transportation request to an available match), the dynamic transportation matching system may account for contextual information (e.g., a geographical region within which the transportation request takes place, the time of day, current trends within a dynamic transportation network, etc.), thereby situationally improving matching efficiencies made possible with higher upper bounds while avoiding requestor dissatisfaction, lost conversions, or other inefficiencies that may result from upper bounds that are too high.

Furthermore, by providing a notification interface for a transportation requestor device that notifies the requestor when to be ready (e.g., shortly before the provider arrives, rather than, e.g., expecting the requestor's attention from when a request is first issued until the provider arrives), a transportation matching application may provide a positive requestor experience while allowing for longer (and, e.g., dynamically determined) match windows. Thus, notifying the requestor at a certain distance before the arrival of the provider (rather than, e.g., notifying the requestor upon being matched with the provider) may enable superior matchings for the requestor (and, e.g., other participants within the transportation network) without substantially delaying travel for the requestor and/or requiring the requestor to wait at attention for a matching. In some examples, by delaying notification to the requestor until a certain distance before the arrival of the provider, systems described herein may continue to search for alternative, superior matchings (e.g., even after making an initial matching for the requestor) without having notified the requestor of the initial matching and, thereby, avoiding confusing the requestor with subsequent changes to the initial matching. According to some examples, a non-visual notification (e.g., vibrating the requestor device) may allow the transportation requestor to relax or focus on other tasks while waiting to be matched with a transportation provider and for the provider to arrive.

Accordingly, as may be appreciated, the systems and methods described herein may improve the functioning of a computer that implements dynamic transportation matching. For example, these systems and methods may improve the functioning of the computer by improving dynamic transportation matching results. Additionally or alternatively, these systems and methods may improve the functioning of the computer by reducing the computing resources consumed to identify appropriate transportation matchings (and, e.g., thereby freeing computing resources for other tasks, such as those directly and/or indirectly involved in dynamic transportation matching).

In addition, in some examples, these systems and methods may improve the functioning of a requestor computer device by improving a transportation request interface of the requestor computer device (e.g., enabling a requestor to request transport and then direct focus away from the requestor computer device until transportation for the requestor is ready). Furthermore, these systems and methods may improve the functioning of the requestor computing device by reducing power consumption (and, e.g., prolonging battery life) by enabling a requestor to turn off (or allow to turn off) the device display while waiting for transport.

Furthermore, for the reasons mentioned above and to be discussed in greater detail below, the systems and methods described herein may provide advantages to dynamic transportation management and/or the field of transportation. In addition, these systems and methods may provide advantages to vehicles (whether piloted by a human driver or autonomous) that operate as a part of a dynamic transportation network. For example, the vehicles may complete transportation tasks more quickly, more efficiently (e.g., in terms of fuel, vehicle wear, etc.), and/or more safely (e.g., by driving, on average, shorter distances to complete the same transportation objective). In some examples, these systems and methods may provide advantages to a dynamic transportation network (and, e.g., to one or more vehicles within the dynamic transportation network) by increasing transportation density and reducing traffic congestion.

FIG. 1 illustrates example dynamic transportation matchings 100(a) and 100(b). As discussed in greater detail below, matchings 100(a) and 100(b) may represent suboptimal matchings that could have been improved with an extended batching window (e.g., collecting transportation requests rather than fulfilling the transportation requests within a very short timeframe to allow matching decisions to be made across a larger group of requests). As shown in FIG. 1, transportation requestors 102, 112, 122, 132, 142, and 152 may request transportation at various times, from various starting locations, and to various destinations. For example, requestor 102 may, at 10:02, submit a request 108 for transportation from a starting location 104 to a destination 106. Requestor 112 may, at 10:02, submit a request 118 for transportation from a start location 114 to a destination 116. Requestor 132 may, at 10:05, submit a request 138 for transportation from a start location 134 to a destination 136. Requestor 152 may, at 10:05, submit a request 158 for transportation from a start location 154 to a destination 156. Requestor 122 may, at 10:08, submit a request 128 for transportation from a start location 124 to a destination 126. Requestor 142 may, at 10:08, submit a request 148 for transportation from a start location 144 to a destination 146.

According to some examples, a transportation matching system may match transportation requests 108, 118, 128, 138, 148, and 158 on an opportunistic basis and/or within a short time window. For example, the transportation matching system may match requests 108 and 118 immediately up receiving requests 108 and 118 (and, e.g., determining a route for fulfilling both requests 108 and 118 with shared transport more efficiently than fulfilling requests 108 and 118 with entirely separate transport), resulting in matching 100(a). In another example, the transportation matching system may delay matching requests 108 and 118 for a short period (e.g., 30 seconds or 60 seconds) to allow for consideration of potential future requests in making matching determinations. However, as shown in FIG. 1, there may be no further requests until 10:05. At 10:05, the transportation matching system may identify requests 138 and 158 and determine that request 158 may be efficiently fulfilled by joining request 158 to matching 100(a) (e.g., before a transportation provider has picked up requestor 102 or after the transportation provider has picked up requestor 102 but before passing location 154). The transportation matching system may further determine that no further requests are available for matching with request 138, and may therefore match request 138 with a transportation provider (e.g., within a short time frame, such as immediately, within 60 seconds, etc.). Subsequently, at 10:08, the transportation matching system may identify requests 128 and 148 and determine that requests 128 and 148 may be efficiently fulfilled by matching with request 128 in matching 100(b).

As may be appreciated, by matching transportation requests, a transportation matching system may provide efficient, on-demand transportation. In addition, by matching transportation requests within a short time window (e.g., within 60 seconds), the transportation matching system may provide a positive experience for requestors, who may otherwise experience uncertainty and anxiety while watching their devices to learn if and when they have been matched for transportation. However, as will be discussed in greater detail below, systems and methods described herein may provide alternative approaches to improving requestor experience while also improving transportation matching efficiency.

Figure 2:
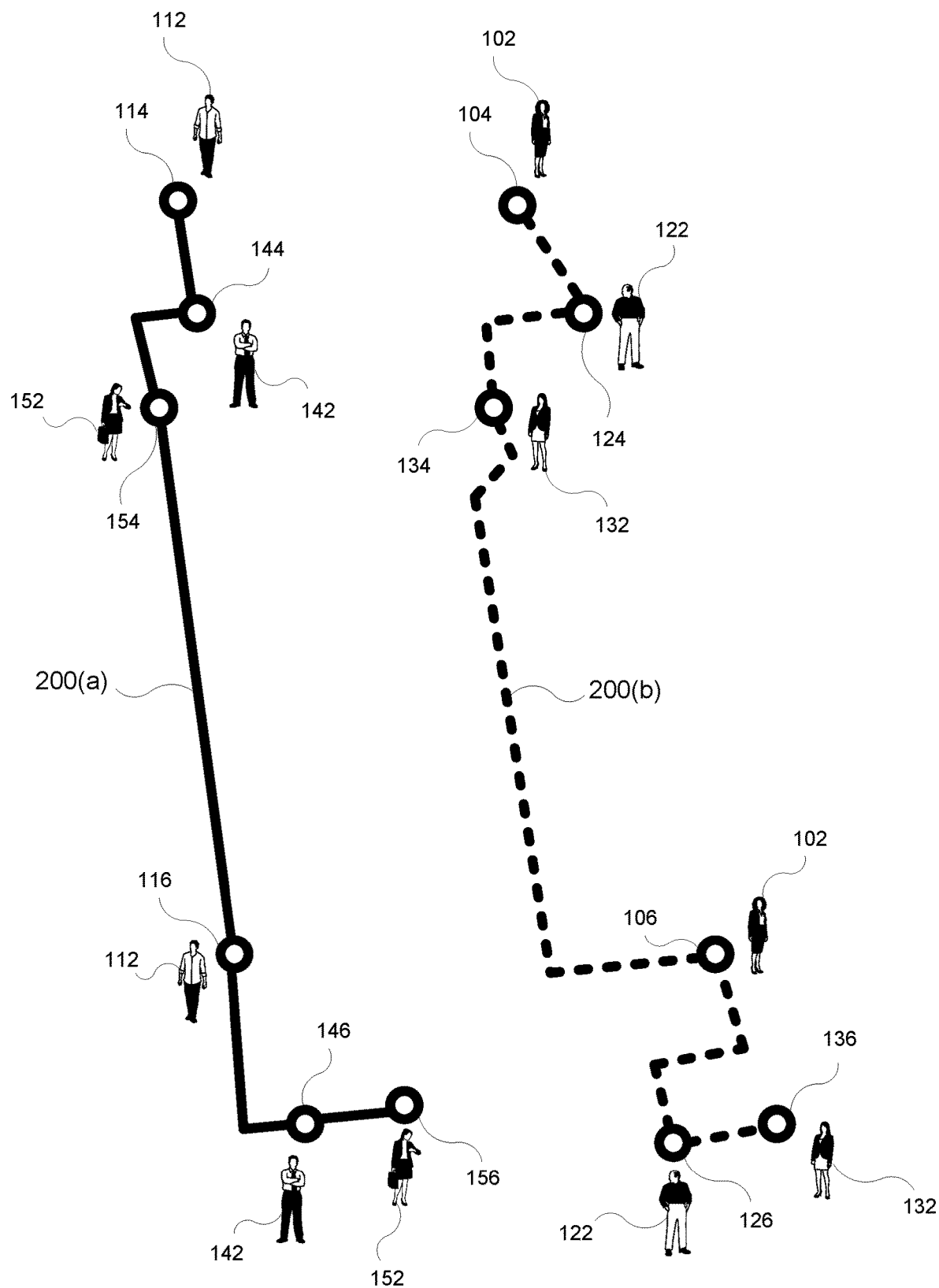
FIG. 2 is an illustration of alternate example dynamic transportation matches performed over extended batching windows.

FIG. 2 illustrates example dynamic transportation matchings 200(a) and 200(b). As discussed in greater detail below, matchings 200(a) and 200(b) may represent matchings that are superior to those shown in matchings 100(a) and 100(b) in FIG. 1. As shown in FIG. 2, transportation requestors 102, 112, 122, 132, 142, and 152 may request transportation as in FIG. 1. However, in the example illustrated in FIG. 2, a dynamic transportation matching system may delay committing to potential matchings, instead accumulating a larger batch of requests before determining optimal matchings amongst the batch of requests. For example, instead of committing to matching 100(a) as shown in FIG. 1 as early as 10:02 (or, e.g., 10:03), the dynamic transportation matching system may collect requests for several more minutes (e.g., at least until 10:08). This may give the dynamic transportation matching system the opportunity to match requestors 112, 142, and 152 together in matching 200(a) and requestors 102, 122, and 132 together in matching 200(b).

As may be appreciated, matchings 200(a) and 200(b) may collectively provide more efficient transport than do matchings 100(a) and 100(b). The dynamic transportation matching system may achieve the more efficient matchings 200(a) and 200(b) due to having a larger batch of requests to consider for differing matchings. The dynamic transportation matching system may determine match efficiency according to any of a variety of factors, including, without limitation, expected total travel time, expected total travel distance, and/or any of a number of additional factors as will be discussed in greater detail below.

Furthermore, the systems described herein may provide a positive transportation requestor experience by providing an interface for transportation requestor devices that does not require a transportation requestor to actively watch and/or monitor a transportation requestor device to confirm if and when a transportation matching has been made with a transportation provider. For example, as will be explained in greater detail below, the interface may include a non-visual notification (e.g., vibrating the transportation requestor device) to alert the transportation requestor to be ready to meet the transportation provider (instead of, e.g., providing a primarily visual or visual-only interface that notifies the transportation requestor when a transportation match has been made). In this manner, transportation requestors may have positive experiences requesting transportation despite relatively long batching windows (e.g., 2 minutes, 5 minutes, 10 minutes, etc.) and/or dynamically determined batching windows of uncertain lengths.

Figure 3:
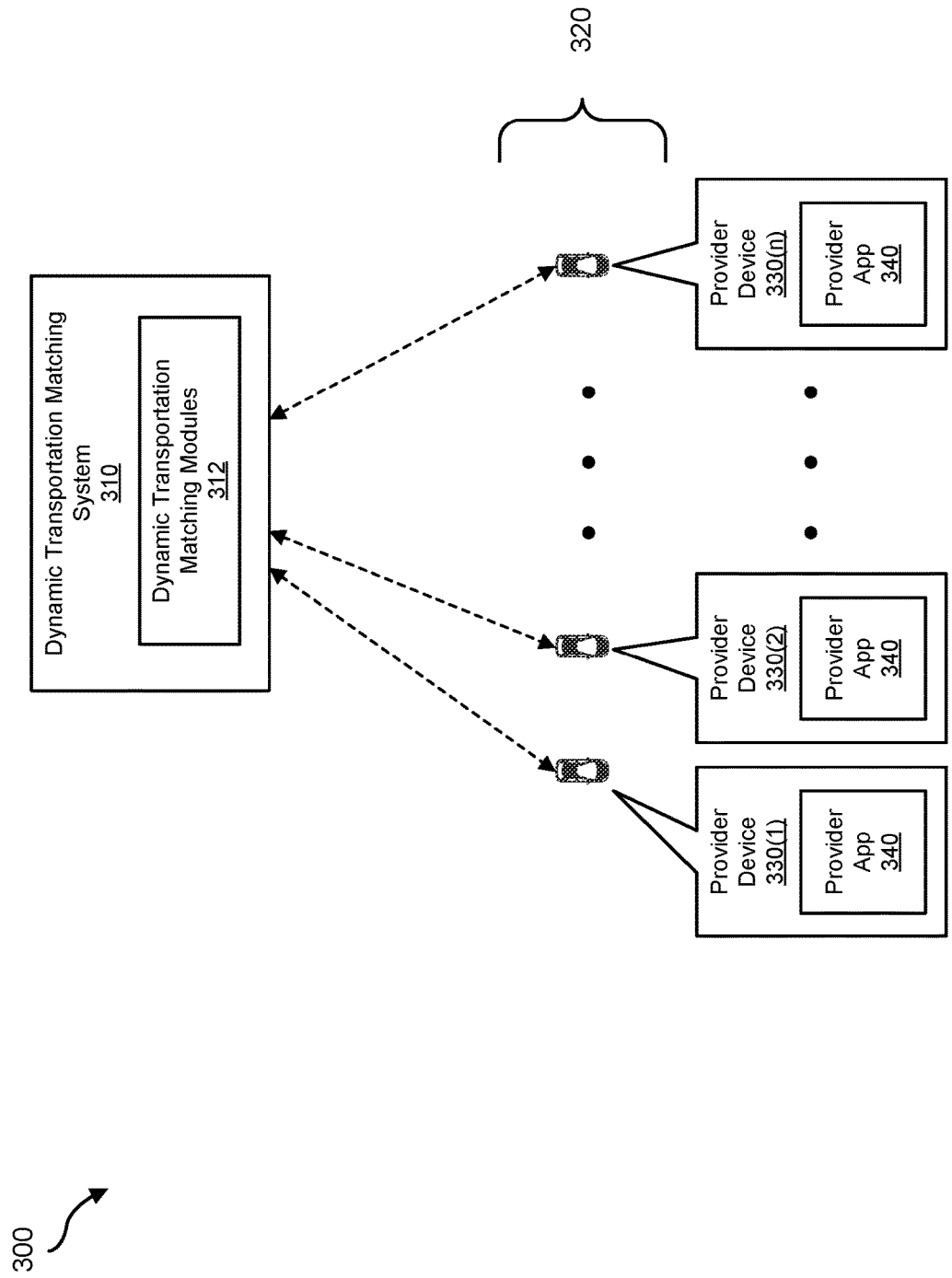
FIG. 3 is an illustration of an example system for matching transportation requests over extended batching windows.

FIG. 3 illustrates an example system 300 for matching transportation requests using simulated future requests. As shown in FIG. 3, a dynamic transportation matching system 310 may be configured with one or more dynamic transportation matching modules 312 that may perform one or more of the steps described herein. Dynamic transportation matching system 310 may represent any computing system and/or set of computing systems capable of matching transportation requests and/or simulating future requests. Dynamic transportation matching system 310 may be in communication with computing devices in each of a group of vehicles 320. Vehicles 320 may represent any vehicles that may fulfill transportation requests. In some examples, vehicles 320 may include disparate vehicle models. In addition, in some examples, many or all of vehicles 320 may be standard commercially available vehicles. According to some examples, many or all of vehicles 320 may be owned by separate individuals (e.g., transportation providers). Furthermore, while, in some examples, many or all of vehicles 320 may be human-operated, in some examples many or all of vehicles 320 may be autonomous (or partly autonomous). Accordingly, throughout the instant disclosure, references to a "transportation provider" (or "provider") may, where appropriate, refer to an autonomous vehicle, an owner of an autonomous vehicle, an operator of an autonomous vehicle, an attendant of an autonomous vehicle, and/or an autonomous system for piloting a vehicle. While FIG. 2 does not specify the number of vehicles 320, it may be readily appreciated that the systems described herein are applicable to hundreds of vehicles, thousands of vehicles, or more. In one example, dynamic transportation matching system 310 may coordinate transportation matchings within a single region for 50,000 vehicles or more on a given day. In some examples, vehicles 320 may collectively form a dynamic transportation network that may provide transportation supply on an on-demand basis to transportation requestors.

As mentioned above, dynamic transportation matching system 310 may communicate with computing devices in each of vehicles 320. The computing devices may be any suitable type of computing device. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a provider for a transportation matching application, a navigation application, and/or any other application suited for the use of providers). Additionally or alternatively, one or more of the computing devices may be devices suitable for installing in a vehicle and/or may be a vehicle's computer that has a transportation management system application installed on the computer in order to provide transportation services to transportation requestors and/or communicate with dynamic transportation matching system 310.

As shown in FIG. 3, vehicles 320 may include provider devices 330(1)-(n) (e.g., whether integrated into the vehicle, permanently affixed to the vehicle, temporarily affixed to the vehicle, worn by a driver of the vehicle, etc.). In some examples, provider devices 330 may include a provider app 340. Provider app 340 may represent any application, program, and/or module that may provide one or more services related to operating a vehicle and/or providing transportation matching services. For example, provider app 340 may include a transportation matching application for providers. In some examples, provider application 340 may match the user of provider app 340 (e.g., a transportation provider) with transportation requestors through communication with dynamic transportation matching system 310. In addition, and as is described in greater detail below, provider app 340 may provide dynamic transportation management system 310 with information about a provider (including, e.g., the current location of the provider) to enable dynamic transportation management system 310 to provide dynamic transportation matching and/or management services for the provider and one or more requestors. In some examples, provider app 340 may coordinate communications and/or a payment between a requestor and a provider. According to some embodiments, provider app 340 may provide a map service, a navigation service, a traffic notification service, and/or a geolocation service.

Figure 4:
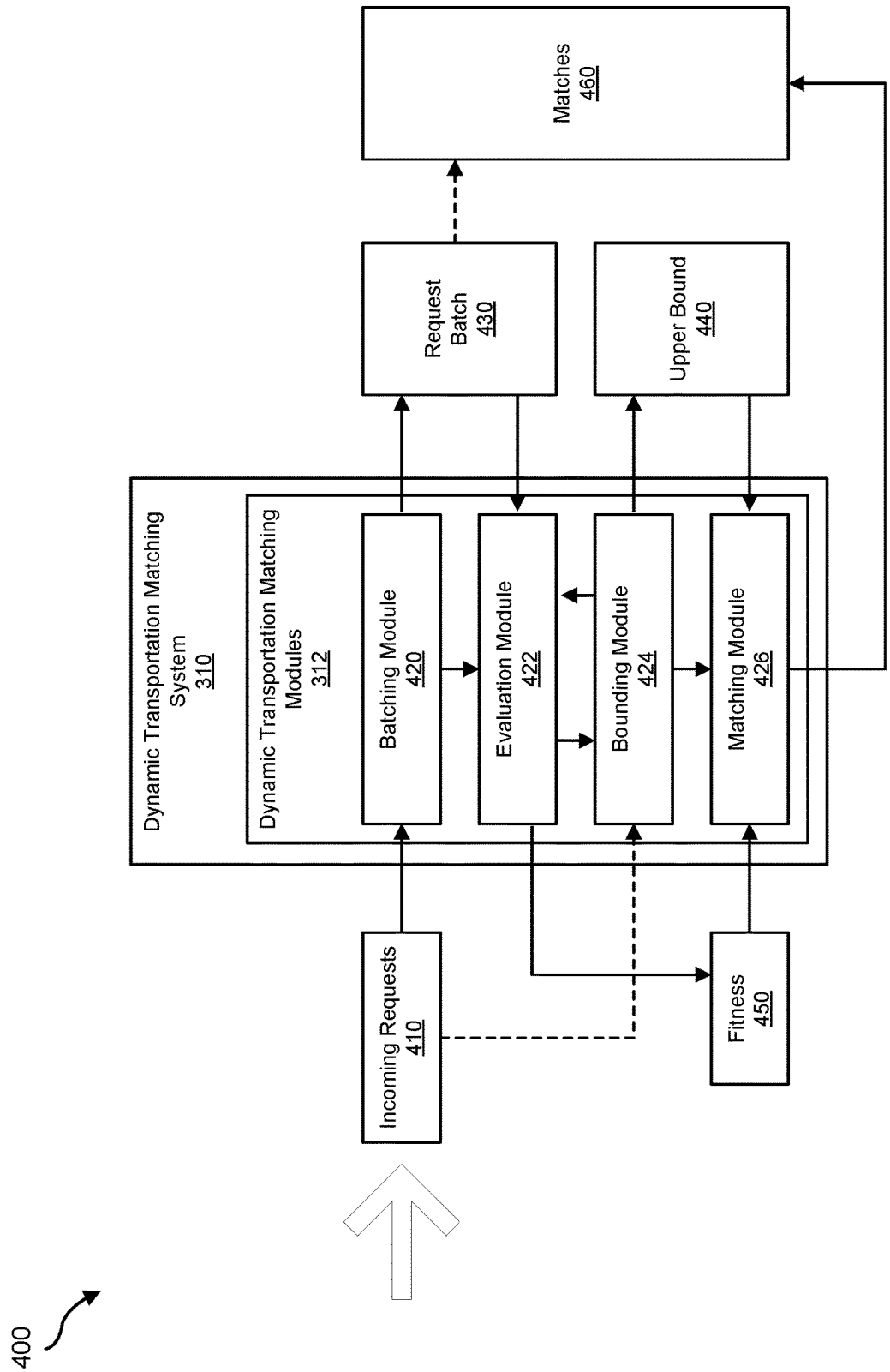
FIG. 4 is an illustration of an example system for matching transportation requests over extended batching windows.

FIG. 4 shows an example system 400 for matching transportation requests using extended batching windows. As shown in FIG. 4, system 400 may include dynamic transportation matching system 310 configured with dynamic transportation modules 312. In one example, as shown in FIG. 4, dynamic transportation matching modules 312 may include a batching module 420, an evaluation module 422, a bounding module 424, and a matching module 426. Dynamic Transportation matching modules may process incoming requests 410.

As an example, batching module 420 may receive incoming requests 410 and include them in a request batch 430. As batching module 420 receives incoming requests, request batch 430 may grow, allowing dynamic transportation matching system 310 to potentially make more efficient matches involving various combinations of requests. Batching module 420 may receive and batch incoming requests 420 in any suitable context. For example, batching module 420 may receive incoming requests for shared transportation (e.g., requests designated for and/or configured to allow matches with other transportation requests, such that a single transportation provider provides transport for two or more transportation requestors for at least a part of each requestor's travel. Additionally or alternatively, batching module 420 may filter incoming requests 410 for requests that are designated for and/or configured to allow matches with other transportation requests. In various examples, incoming requests 410 may include transportation requests with origins corresponding to a specified area and/or destinations corresponding to a specified area.

Evaluation module 422 may evaluate a fitness 450 of one or more potential matchings between two or more transportation requests within request batch 430. As used herein, the term "fitness" may refer to any score, ranking, weight, and/or orderable metric. In some examples, the term "fitness" may refer to an expected value and/or an expression that is maximized by an objective function. For example, evaluation module 422 may determine match efficiency according to any of a variety of factors, including, without limitation, expected total travel time, expected total travel distance, fare paid by transportation requestors, fare collected by transportation providers, fare collected by a dynamic transportation service provider, transportation costs (e.g., fuel, tolls, etc.), increased transportation density resulting in lower traffic in congested areas, transportation provider distribution (e.g., routes resulting in transportation providers ending in locations expected to have a higher transportation demand may provide greater efficiency for a dynamic transportation network), requestor preferences (e.g., the type of provider vehicle, wait times), travel comfort (e.g., the amount of stop-and-go involved in a potential route, the view of a potential route, etc.), etc. In some examples, evaluation module 422 may determine the pairwise (or n-wise) match efficiency of matching two or more requests together. Additionally or alternatively, evaluation module 422 may determine an aggregate efficiency of a set of matchings within request batch 430. In some examples, evaluation module 422 may determine an expected efficiency of one or more potential matchings in light of one or more potential future states (e.g., the probability of future requests originating in particular areas, the probability of providers becoming available or unavailable for fulfilling transportation requests in particular areas in the future, etc.).

Bounding module 424 may determine, for any given transportation request within request batch 430, an upper bound 440 for an amount of time to monitor changes within request batch 430 for potential matchings involving the transportation request (before, e.g., committing the transportation request to the best available matching). Bounding module 424 may determine upper bound 440 for a transportation request in any of a variety of ways. For example, bounding module 424 may determine upper bound 440 for a transportation request based on one or more characteristics of the transportation request. In some examples, bounding module 424 may determine upper bound 440 for the transportation request based a geographical area to which the transportation request pertains (e.g., a starting location for transportation and/or a destination for transportation). In some examples, requests within request batch 430 may all pertain to the same geographical area (e.g., requests corresponding to a geographical area may be batched together). Bounding module 424 may determine upper bound 440 based on the geographical area pertaining to the transportation request in any of a variety of ways. For example, one or more of the systems described herein (e.g., bounding module 424) may simulate (e.g., based on historical data) multiple matching scenarios (e.g., specifying simulated and/or historical transportation requests, transportation providers, and/or contextual conditions such as traffic, weather, events, etc.) and simulate differing upper bounds for each scenario. Systems described herein may then evaluate simulated outcomes of the matching scenarios using the differing upper bounds and determine an optimal upper bound for the geographical area based on the simulated outcomes. As another example of the use of the geographical area pertaining to a request, bounding module 424 may set a higher upper bound in areas with low transportation request rates and/or low population density and a lower upper bound in areas with high transportation request rates and/or high population density.

In some examples, bounding module 424 may determine the upper bound based on transportation supply and/or transportation demand within a geographical area. For example, bounding module 424 may determine the upper bound based on an amount of transportation requested within a dynamic transportation a geographical region (e.g., decreasing the upper bound as the amount of requested transportation increases and matching multiple requestors to a single transportation provider becomes easier). As another example, bounding module 424 may determine the upper bound based on an availability of transportation providers within the dynamic transportation network to provide transportation within the geographical region (e.g., increasing the upper bound as the availability of transportation providers decreases and matching requestors to providers becomes more difficult).

In some examples, bounding module 424 may use one or more characteristics of a transportation requestor (being a type of characteristic of a transportation request) to determine upper bound 440. For example, bounding module 424 may determine, based on historical data relating to the transportation requestor, the probability that the transportation requestor will cancel the transportation request as a function of time after the transportation requestor has submitted the transportation request. In some examples, bounding module 424 may determine, based on historical data relating to the transportation requestor and/or one or more additional transportation requestors (e.g., who share one or more characteristics with the transportation requestor, who are similarly situated to the transportation requestor, and/or who have submitted transportation requests similar to that of the transportation requestor), the probability that the transportation requestor will cancel the transportation request as a function of time. Thus, bounding module 424 may minimize the probability that the transportation requestor will cancel the transportation request (e.g., subject to one or more additional constraints).

In some examples, bounding module 424 may determine upper bound 440 based at least in part on an elasticity associated with the transportation request. For example, bounding module 424 may determine that the demand for transportation on the part of the transportation requestor is sensitive to a cost associated with the transportation (e.g., money spent on the transportation and/or time spent waiting for the transportation to arrive, to be confirmed, etc.). Bounding module 424 may determine the elasticity associated with the transportation request in any of a variety of ways. For example, bounding module 424 may use historical data indicating the elasticity of past transportation demand by the transportation requestor. Additionally or alternatively, bounding module 424 may use user-supplied preference data about the transportation requestor that indicates the elasticity of transportation demand by the transportation requestor. In some examples, bounding module 424 may evaluate the elasticity associated with the transportation request based on historical data of other transportation requestors (e.g., who are similarly situated to the transportation requestor) within the dynamic transportation network. According to some examples, bounding module 424 may set higher upper bounds for transportation requests determined to have higher associated elasticity with respect to money (e.g., to improve the chances of finding a matching to save money for the transportation requestor). In some examples, bounding module 424 may set lower upper bounds for transportation requests determined to have higher associated elasticity with respect to time (e.g., to reduce the chances that the transportation requestor waits too long to receive a confirmed matching and/or to arrive at the specified destination).

In another example, bounding module 424 may determine upper bound 440 based one or more contextual conditions in which the transportation request was submitted and/or is pending. For example, bounding module 424 may determine upper bound 440 based on the time of day (e.g., which may affect traffic patterns, transportation request rates, and/or transportation provider availability). As another example, bounding module 424 may determine upper bound 440 based on the weather (e.g., reducing the upper bound in poor weather conditions where requestors may be waiting outside). In a further example, bounding module 424 may determine upper bound 440 based on recent transportation requests (e.g., based on the trailing 5-minute demand for transportation within the dynamic transportation network by reducing the upper bound 440 when many requests are expected).

According to some examples, bounding module 424 may determine upper bound 440 for a transportation request once dynamic transportation matching system 310 receives the transportation request. In some examples, bounding module 424 may dynamically determine and/or adjust upper bound 440 for the transportation request as the transportation request waits in request batch 430 for a match. For example, bounding module 424 may adjust upper bound 440 in response to new information about the transportation request, about one or more transportation providers, and/or about one or more environmental conditions within which the transportation request would be fulfilled (including, e.g., any of the factors that may be used to determine upper bound 440 as described above).

In some examples, bounding module 424 may determine upper bound 440 for a transportation request on an individual basis. According to some examples, bounding module 424 may determine upper bound 440 for a group of transportation requests (e.g., for all transportation requests 430 within request batch 430 at a given time). In one example, bounding module 424 may set upper bound 440 according to a timetable, such that batches of requests are matched to each other and/or transportation providers according to the timetable. For example, the timetable may specify periodic batching periods (e.g., where the dynamic transportation matching system matches requests in a batch every 5 five minutes from the hour). In this manner, matching times may be more predictable to transportation requestors.

In various examples, upper bound 440 may be at least about two minutes, at least about three minutes, at least about four minutes, at least about five minutes, at least about six minutes, at least about seven minutes, at least about eight minutes, at least about ten minutes, at least about 15 minutes, at least about 20 minutes, at least about 25 minutes, at least about 30 minutes, or at least about an hour. In one example, upper bound 440 may vary according to the density of prospective travelers in the area of the request (e.g., estimated by population density), such that upper bound 440 would be about two minutes in an area with a high population density (e.g., in an urban area and/or in an area with a population density above a determined threshold), about 5 to 10 minutes in an area with a low population density (e.g., outside an urban area and/or in an area with a population density between determined thresholds), and about 30 minutes to an hour in an area with a very low population density (e.g., a semi-rural area and/or in an area with a population density below a determined threshold).

Matching module 426 may match two or more transport requests based at least in part on the fitness 450 of one or more candidate matchings between one or more transportation requests within request batch 430 and at least in part on upper bound 440. For example, matching module 426 may execute a candidate matching (or set of matchings) if fitness 450 exceeds a set threshold. As another example, matching module 426 may execute a candidate matching (or set of matchings) if upper bound 440 has been reached (or, in some examples, has nearly been reached). In some examples, the threshold for fitness 450 may decline as the time one or more requests have spent in request batch 430 approaches upper bound 440. Thus, for example, matching module 426 may relax the criteria for committing to a candidate matching (or set of matchings) as upper bound 440 is approached (e.g., such that matching module 426 will commit to any candidate matching that meets a base set of criteria once upper bound 440 is reached). Matching module 426 may, accordingly, produce matches 460 from request batch 430.

Figure 5:
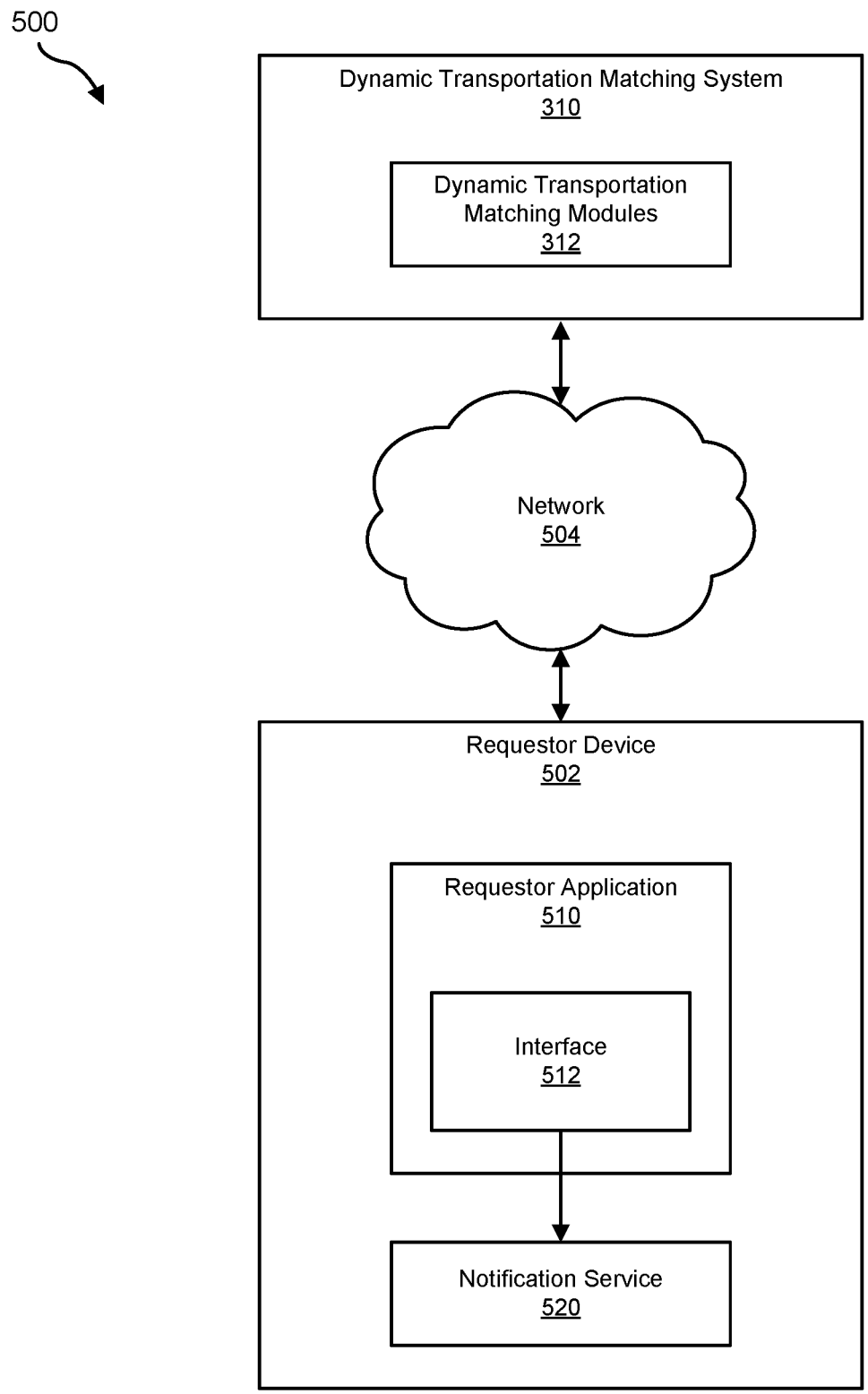
FIG. 5 is an illustration of an example system for matching transportation requests over extended batching windows.

FIG. 5 illustrates an example system 500 for matching transportation requests using extended batching windows. As shown in FIG. 5, system 500 may include dynamic transportation matching system 310 (configured with dynamic transportation matching modules 312) in communication with a requestor device 502 over a network 504. Network 504 may include any suitable type of network, including, without limitation, the Internet, cellular communication networks, and mesh networks. In some examples, requestor device 502 may include a mobile device (e.g., a smart phone). Requestor device 502 may be configured with a requestor application 510 configured to communicate with dynamic transportation matching system 310. In some examples, requestor application 510 may enable a transportation requestor to submit transportation requests to dynamic transportation matching system 310.

Requestor application 510 may include an interface 512 for enabling the transportation requestor to submit transportation requests and/or to receive information and/or instructions about submitted transportation requests. In some examples, as will be explained in greater detail below, interface 512 may provide a notification (e.g., via a notification service 520) to the transportation requestor a period of time after dynamic transportation matching system 310 has already committed to matching the transportation request with a transportation provider. For example, interface 512 may provide the notification based on the proximity of the transportation provider to the transportation requestor. As used herein, the term "proximity" as applied to transportation providers and requestors may refer to any type of proximity, including temporal proximity (e.g., an estimated time of arrival of the transportation provider to the transportation requestor), road-distance proximity, and/or any other metric that may correlate with temporal proximity. Thus, interface 512 may provide the notification when the transportation provider is sufficiently near to the transportation requestor (e.g., in terms of expected time of arrival and/or of distance). For example, interface 512 may provide the notification when the transportation provider is about two minutes away from the transportation requestor (and may display the time estimate to the transportation requestor). According to some examples, interface 512 may not provide a notification to the transportation provider at the time the matching is made. Instead, in some examples, the notification received when the transportation provider is sufficiently near may be the earliest notification to the transportation requestor confirming that the transportation requestor has been successfully matched to a transportation provider.

In some examples, requestor application 510 may determine an amount of time in advance to provide the notification to the transportation requestor based on one or more characteristics of the transportation requestor. For example, requestor application 510 may determine an amount of time in advance to provide the notification based at least in part on an expected amount of time it will take for the transportation requestor to arrive at a meeting location after receiving the notification. For example, requestor application 510 may determine that the transportation requestor is inside a building (and, e.g., that the transportation requestor is not on the ground floor of the building) and notify the transportation requestor further in advance (e.g., 7 minutes in advance instead of 2 minutes in advance to provide 5 minutes for the transportation requestor to exit the building). Additionally or alternatively, requestor application 510 may determine, based on historical data, how long the transportation requestor typically takes to meet with the transportation provider following notification and determine an amount of time in advance to provide the notification based on the determination (e.g., such that the probability that the transportation requestor will keep the transportation provider waiting for beyond a threshold amount of time falls below a threshold probability, such that an expected amount of time that the transportation provider is kept waiting falls below a threshold, and/or such that a probability that the transportation is cancelled by the transportation provider and/or the transportation requestor falls below a threshold). Similarly, requestor application 510 may determine, based on historical data involving one or more other transportation requestors (e.g., that share one or more characteristics with the transportation requestor) and/or one or more other transportation requests that were submitted from the same location as that of the transportation requestor.

In some examples, requestor application 510 may determine an amount of time to provide the notification in advance based on one or more contextual factors. For example, requestor application 510 may provide the notification further in advance during inclement weather (e.g., rain, snow, cold, heat, wind, etc.) to allow the transportation requestor to take shelter and still have sufficient time to meet the transportation provider.

According to some examples, once the transportation requestor has submitted the transportation request via requestor application 510, interface 512 may display a notice to the transportation requestor informing the transportation requestor that the transportation requestor need not focus on requestor device 502, requestor application 510, and/or interface 512. For example, interface 512 may display a notice informing the transportation requestor that the transportation requestor may close requestor application 510, that the transportation requestor may turn off the display of requestor device 502, and/or that the transportation requestor may expect to receive the notification when the transportation provider is sufficiently near. In some examples, interface 512 may notify the transportation requestor of the amount of time that the transportation requestor will be notified in advance (e.g., so that the transportation requestor may plan on how near to be to a location for meeting the transportation provider). In some examples, interface 512 may provide an interface element for the transportation requestor to adjust and/or enter the amount of time to be notified in advance (subject to, e.g., a limit based on an amount of time that dynamic transportation matching system 310 determines that the matching may be expected to be committed to in advance of the arrival of the transportation provider).

The notification may include any suitable type of notification. In some examples, the notification may include a non-visual notification, allowing the transportation requestor to direct focus on something other than requestor device 502 and/or requestor application 510. For example, the notification may include a vibration and/or a sound. In some examples, the non-visual notification may be accompanied by a visual notification providing the transportation requestor with details about the proximity, progress, and/or identity (e.g., name, vehicle make and model, vehicle color, license plate, etc.) of the transportation provider.

FIGS. 6-9 illustrate an example transportation requestor interface. As will be explained in greater detail below, FIGS. 6-9 illustrate the transportation requestor interface at various stages from submitting a transportation request to notifying the transportation requestor that the transportation provider is near.

Figure 6:
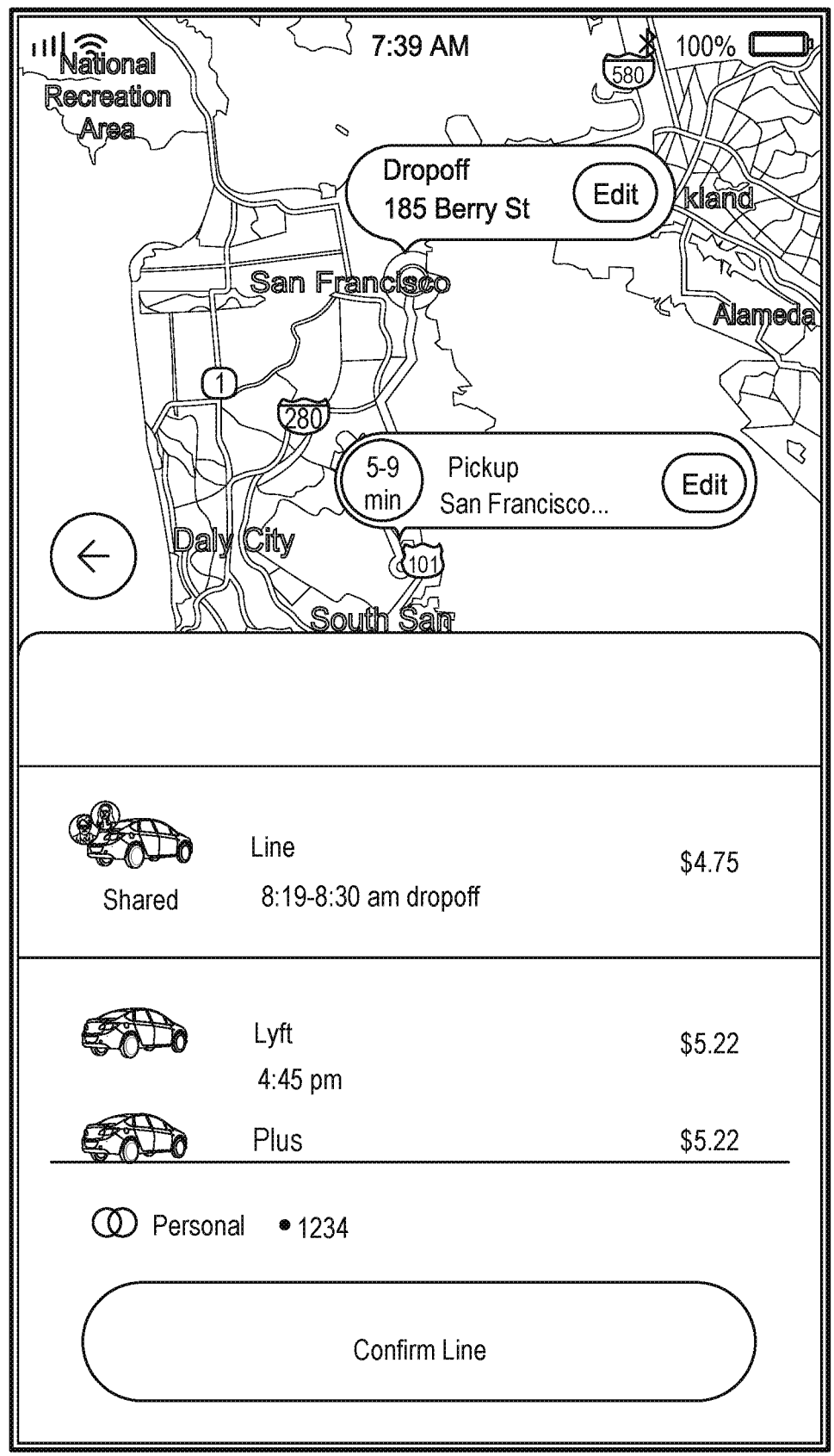
FIG. 6 is an illustration of an example graphical interface for transportation requests matched over extended batching windows.

FIG. 6 illustrates the transportation requestor interface in a first stage. As shown in FIG. 6, the transportation requestor interface may allow a transportation requestor to submit a transportation request to the dynamic transportation matching system by specifying a starting location and a destination. In some examples, as illustrated in FIG. 6, the transportation requestor interface may provide an estimate of how long it will take for a transportation provider to arrive to pick up the transportation requestor.

Figure 7:
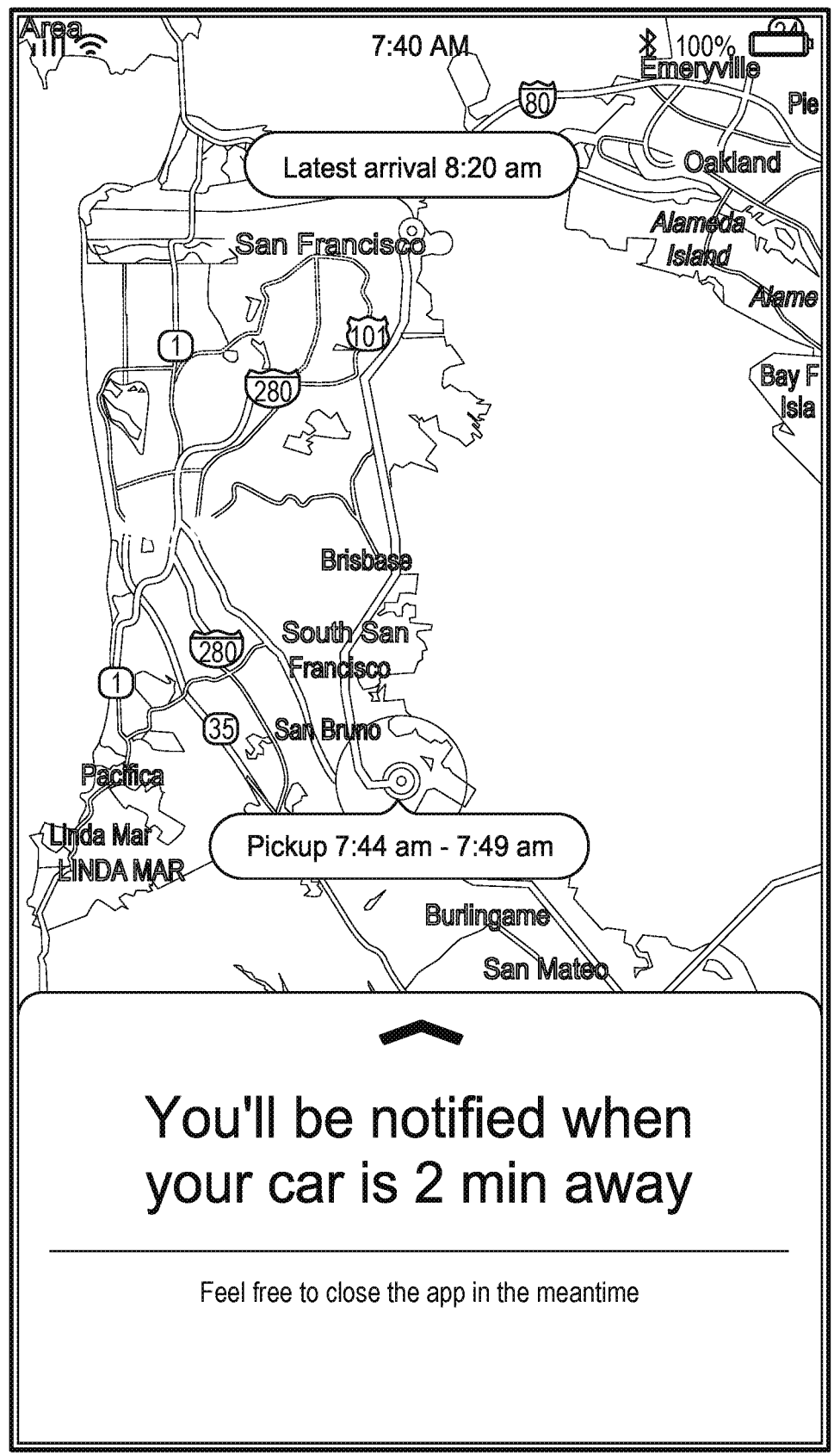
FIG. 7 is an illustration of an example graphical interface for transportation requests matched over extended batching windows.

FIG. 7 illustrates the transportation requestor interface after the transportation requestor has submitted the transportation request. As shown in FIG. 7, the transportation requestor interface may display an instruction to the transportation requestor that the transportation requestor may close the application (e.g., instead of monitoring the application awaiting confirmation of a matching with a transportation provider). In addition, as shown in FIG. 7, the transportation requestor interface may display a note informing the transportation requestor of the amount of time in advance of the arrival of the transportation provider that the transportation requestor will be notified.

Figure 8:
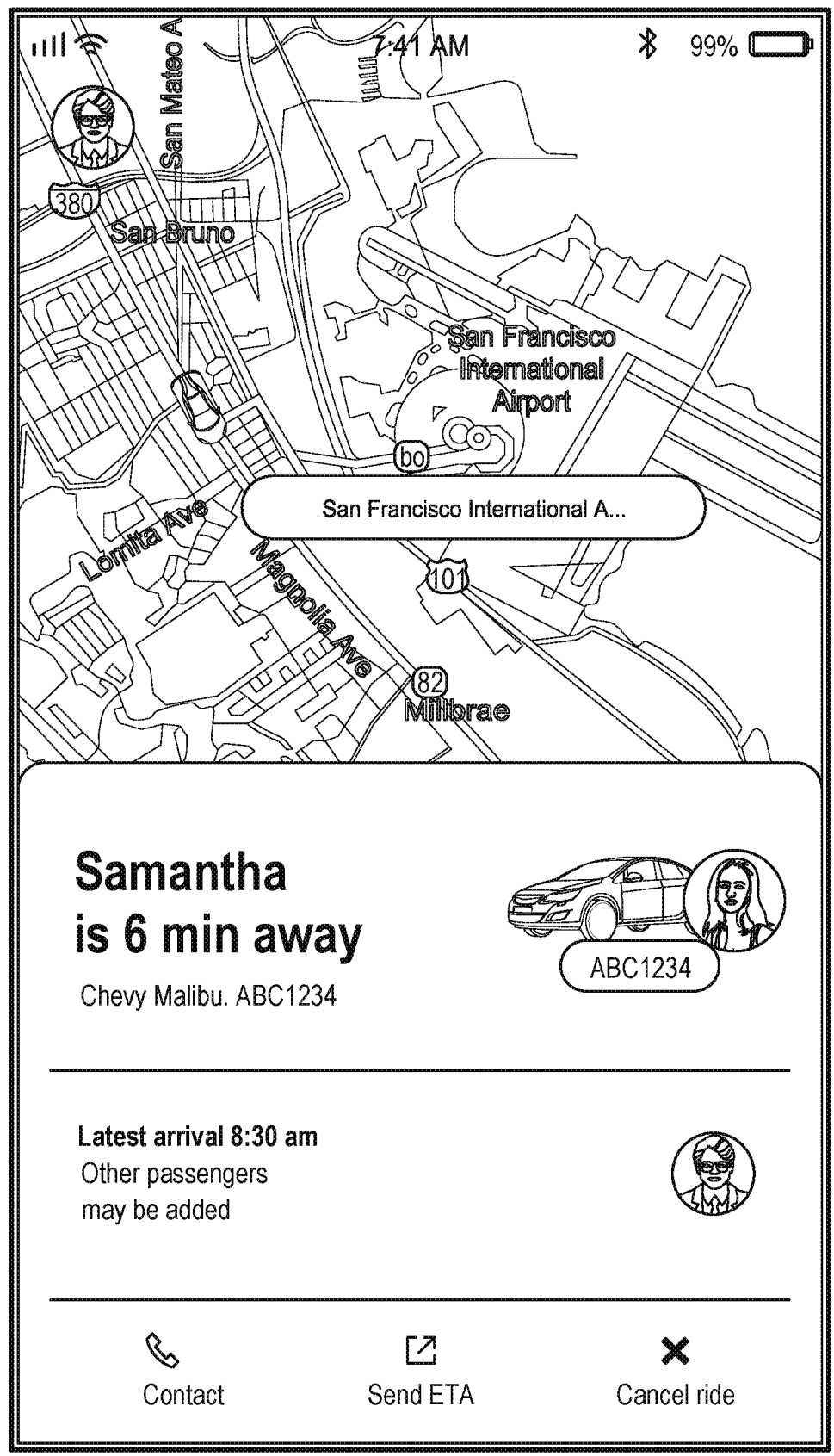
FIG. 8 is an illustration of an example graphical interface for transportation requests matched over extended batching windows.

FIG. 8 illustrates the transportation requestor interface after the dynamic transportation matching system has matched transportation request with a transportation provider. Although the transportation requestor interface will notify the transportation requestor when the transportation provider is drawing near, and the transportation requestor may not require additional information, the transportation requestor interface may nevertheless display information about the transportation provider (including, e.g., the proximity of the transportation provider) in advance of the subsequent notification.

Figure 9:
FIG. 9 is an illustration of an example graphical interface for transportation requests matched over extended batching windows.

FIG. 9 illustrates a notification from the transportation requestor interface once the transportation provider has come sufficiently near to a pick-up location. As shown in FIG. 9, the transportation requestor may have closed the transportation requestor application and/or turned off (or allowed to turn off) the display of the transportation requestor device. Accordingly, once the transportation requestor receives a notification (e.g., a vibration), the transportation requestor may see a visual notification on the lock screen of the transportation requestor device.

FIG. 10 illustrates an example method 1000 for matching transportation requests using extended batching windows.

As shown in FIG. 10, at step 1010 the method may include receiving, by a dynamic transportation matching system, a first transport request and a second transport request. At step 1020 the method may include entering the first transport request and the second transport request into a batch of transport requests. At step 1030 the method may include evaluating, by the dynamic transportation matching system, a fitness of matching the first transport request with the second transport request to be completed by a transport provider. At step 1040 the method may include determining, based at least in part on a characteristic of the first transport request, an upper bound for an amount of time to monitor the batch of transport requests for potential alternative matchings involving the first transport request with a greater fitness than the fitness of matching the first transport request with the second transport request. At step 1050 the method may include matching a provider computing device associated with the transport provider with the first transport request and with the second transport request based at least in part on the fitness of matching the first transport request with the second transport request and based at least in part on a constraint to match the first transport request within the upper bound.

In some examples, matching the first transport request with the second transport request based at least in part on the upper bound may include (i) determining a current proximity to the upper bound, (ii) determining, based at least in part on the current proximity to the upper bound, a fitness threshold for accepting a candidate matching involving the first transport request, and (iii) determining that the fitness of matching the first transport request with the second transport request exceeds the fitness threshold.

In some examples, the notification to the transportation requestor may be the earliest notification to the transportation requestor of the first transport request being matched with the transport provider.

According to some examples, matching the first transport request with the second transport request may be further based at least in part on at least one of (i) evaluating a fitness of matching the first transport request with an alternative transport request, and (ii) evaluating a fitness of matching the second transport request with an alternative transport request.

In some examples, the characteristic of the first transport request may include a geographical region to which the first transport request pertains. Furthermore, the characteristic of the first transport request may include (i) an amount of transportation requested within a dynamic transportation network within the geographical region and/or (ii) an availability of transportation providers within the dynamic transportation network to provide transportation within the geographical region. In some examples, the characteristic of the first transport request may include an elasticity associated with the first transport request.

According to some examples, determining, based at least in part on the characteristic of the first transport request, the upper bound may include (i) identifying the characteristic of the first transport request upon receiving the first transport request, and (ii) setting the upper bound upon receiving the first transport request.

In some examples, determining, based at least in part on the characteristic of the first transport request, the upper bound may include dynamically adjusting the upper bound based at least in part on a change to a contextual condition that impacts an expected fitness of potential future matchings involving the first transport request in light of the characteristic.

According to some examples, determining the upper bound may include (i) simulating a plurality of matching scenarios, (ii) applying a plurality of differing upper bounds for waiting for alternative matchings within to the plurality of matching scenarios, (iii) evaluating outcomes of applying each of the plurality of differing upper bounds to the plurality of matching scenarios, and (iv) selecting the upper bound based at least in part on evaluating the outcomes of applying each of the plurality of differing upper bounds to the plurality of matching scenarios.

In some examples, the upper bound may be at least two minutes.

According to some examples, the method may also include sending, by the dynamic transportation matching system to a transportation requestor device corresponding to the first transport request, an instruction for the transportation requestor device to provide a non-visual notification to a transportation requestor in possession of the transportation requestor device based on a proximity of the shared transport provider to the transportation requestor.

In some examples, providing the non-visual notification to the transportation requestor is further based on a distance of the transportation requestor from a meeting location for the shared transport provider and the transportation requestor. According to some examples, the non-visual notification may include a vibration of the transportation requestor device.

In some examples, the transportation requestor device may further display an initial notification to the transportation requestor, after submitting the first transport request and before receiving information indicating that the first transport request has been matched with a transport provider, the initial notification instructing the transportation requestor to expect the non-visual notification.

According to some examples, determining the upper bound may include (i) identifying a timetable according to which transportation requests within a dynamic transportation network are batch processed and (Ii) setting the upper bound according to a time specified by the timetable.

In some examples, evaluating the fitness of matching the first transport request within the second transport request may include calculating a score for matching the first transport request with the second transport request. Additionally or alternatively, evaluating the fitness of matching the first transport request with the second transport request may be based at least in part on a transportation overlap between the first transport request and the second transport request when completed by the transport provider.

In some examples, a corresponding system for matching transportation requests using extended batching windows may include one or more physical processors and one or more memories coupled to one or more of the physical processors, the one or more memories including instructions operable when executed by the one or more physical processors to cause the system to perform operations including (i) receiving, by a dynamic transportation matching system, a first transport request and a second transport request, (ii) entering the first transport request and the second transport request into a batch of transport requests, (iii) evaluating, by the dynamic transportation matching system, a fitness of matching the first transport request with the second transport request to be fulfilled by a shared transport provider, based at least in part on a transportation overlap between the first transport request and the second transport request when fulfilled by the shared transport provider, (iv) determining, based at least in part on a characteristic of the first transport request, an upper bound for an amount of time to monitor changes within the batch of transport requests for potential alternative matchings involving the first transport request with a greater fitness than the fitness of matching the first transport request with the second transport request, and (v) matching the first transport request with the second transport request based at least in part on the fitness of matching the first transport request with the second transport request and based at least in part on the upper bound for the amount of time to monitor changes within the batch of transport requests.

A corresponding non-transitory computer-readable storage medium may include computer-readable instructions that, when executed by at least one processor of a computing device, cause the computing device to (i) receive, by a dynamic transportation matching system, a first transport request and a second transport request, (ii) enter the first transport request and the second transport request into a batch of transport requests, (iii) evaluate, by the dynamic transportation matching system, a fitness of matching the first transport request with the second transport request to be fulfilled by a shared transport provider, based at least in part on a transportation overlap between the first transport request and the second transport request when fulfilled by the shared transport provider, (iv) determine, based at least in part on a characteristic of the first transport request, an upper bound for an amount of time to monitor changes within the batch of transport requests for potential alternative matchings involving the first transport request with a greater fitness than the fitness of matching the first transport request with the second transport request, and (v) match the first transport request with the second transport request based at least in part on the fitness of matching the first transport request with the second transport request and based at least in part on the upper bound for the amount of time to monitor changes within the batch of transport requests.

Embodiments of the instant disclosure may include or be implemented in conjunction with a dynamic transportation matching system. A transportation matching system may arrange rides on an on-demand and/or ad-hoc basis by, e.g., matching one or more ride requestors with one or more ride providers. For example, a transportation matching system may provide one or more transportation matching services for a ridesharing service, a ridesourcing service, a taxicab service, a car-booking service, an autonomous vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

Figure 11:
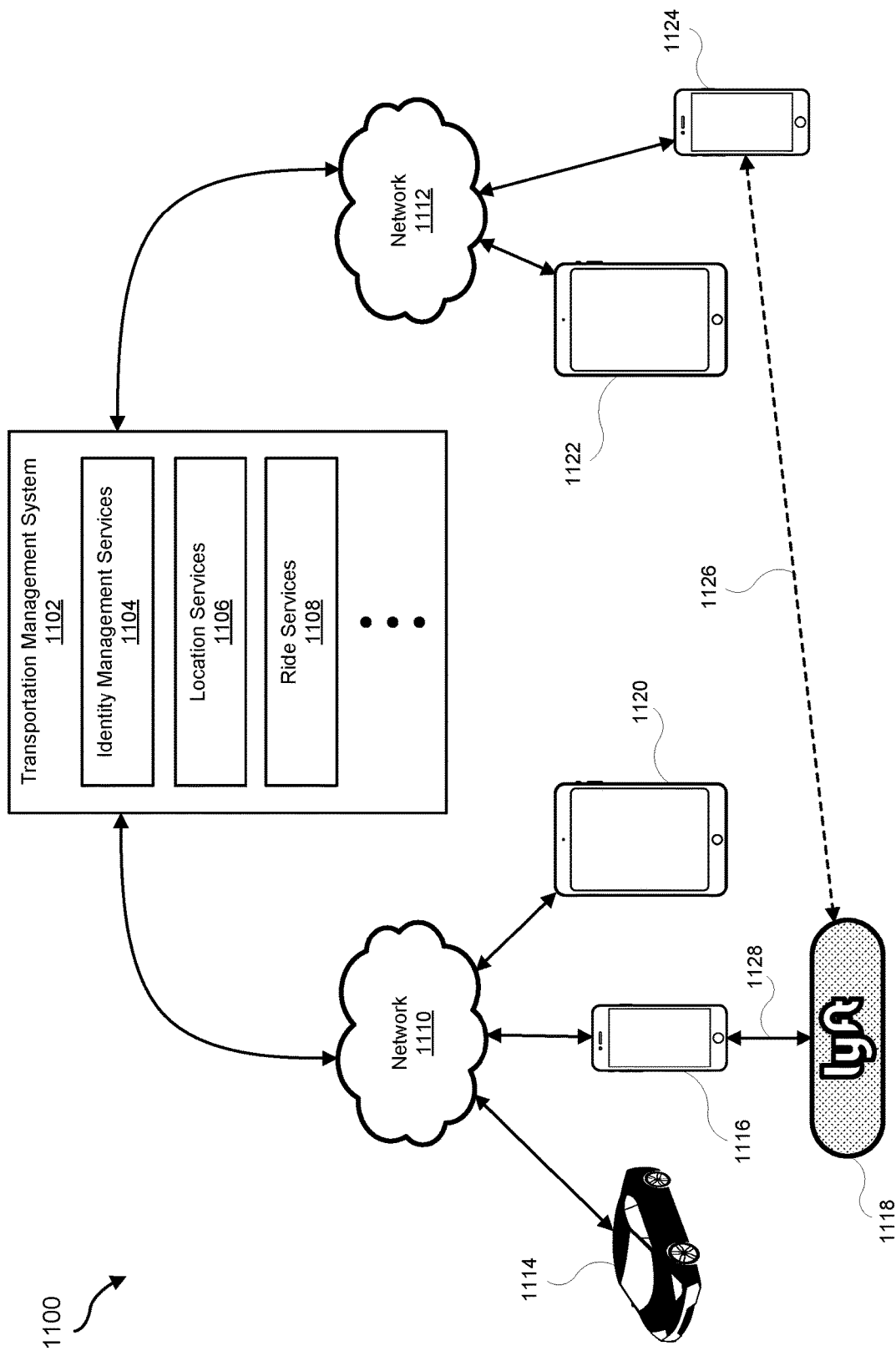
FIG. 11 is an illustration of an example requestor/provider management environment.

FIG. 11 shows a transportation management environment 1100, in accordance with various embodiments. As shown in FIG. 11, a transportation management system 1102 may run one or more services and/or software applications, including identity management services 1104, location services 1106, ride services 1108, and/or other services. Although FIG. 11 shows a certain number of services provided by transportation management system 1102, more or fewer services may be provided in various implementations. In addition, although FIG. 11 shows these services as being provided by transportation management system 1102, all or a portion of any of the services may be processed in a distributed fashion. For example, computations associated with a service task may be performed by a combination of transportation management system 1102 (including any number of servers, databases, etc.), one or more devices associated with a provider (e.g., devices integrated with managed vehicles 1114, provider's computing devices 1116 and tablets 1120, and transportation management vehicle devices 1118), and/or more or more devices associated with a ride requestor (e.g., the requestor's computing devices 1124 and tablets 1122). In some embodiments, transportation management system 1102 may include one or more general purpose computers, server computers, clustered computing systems, cloud-based computing systems, and/or any other computing systems or arrangements of computing systems. Transportation management system 1102 may be configured to run any or all of the services and/or software components described herein. In some embodiments, the transportation management system 1102 may include an appropriate operating system and/or various server applications, such as web servers capable of handling hypertext transport protocol (HTTP) requests, file transfer protocol (FTP) servers, database servers, etc.

In some embodiments, identity management services 1104 may be configured to perform authorization services for requestors and providers and/or manage their interactions and/or data with transportation management system 1102. This may include, e.g., authenticating the identity of providers and determining that they are authorized to provide services through transportation management system 1102. Similarly, requestors' identities may be authenticated to determine whether they are authorized to receive the requested services through transportation management system 1102. Identity management services 1104 may also manage and/or control access to provider and/or requestor data maintained by transportation management system 1102, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1102 may also manage and/or control access to provider and/or requestor data stored with and/or obtained from third-party systems. For example, a requester or provider may grant transportation management system 1102 access to a third-party email, calendar, or task management system (e.g., via the user's credentials). As another example, a requestor or provider may grant, through a mobile device (e.g., 1116, 1120, 1122, or 1124), a transportation application associated with transportation management system 1102 access to data provided by other applications installed on the mobile device. In some examples, such data may be processed on the client and/or uploaded to transportation management system 1102 for processing.

In some embodiments, transportation management system 1102 may provide ride services 1108, which may include ride matching and/or management services to connect a requestor to a provider. For example, after identity management services module 1104 has authenticated the identity a ride requestor, ride services module 1108 may attempt to match the requestor with one or more ride providers. In some embodiments, ride services module 1108 may identify an appropriate provider using location data obtained from location services module 1106. Ride services module 1108 may use the location data to identify providers who are geographically close to the requestor (e.g., within a certain threshold distance or travel time) and/or who are otherwise a good match with the requestor. Ride services module 1108 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 1108 may use rule-based algorithms and/or machine-learning models for matching requestors and providers.

Transportation management system 1102 may communicatively connect to various devices through networks 1110 and/or 1112. Networks 1110 and 1112 may include any combination of interconnected networks configured to send and/or receive data communications using various communication protocols and transmission technologies. In some embodiments, networks 1110 and/or 1112 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1110 and/or 1112 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 802.11 family of standards, Bluetooth, Bluetooth Low Energy, Near Field Communication (NFC), Z-Wave, and ZigBee). In various embodiments, networks 1110 and/or 1112 may include any combination of networks described herein or any other type of network capable of facilitating communication across networks 1110 and/or 1112.

In some embodiments, transportation management vehicle device 1118 may include a provider communication device configured to communicate with users, such as drivers, passengers, pedestrians, and/or other users. In some embodiments, transportation management vehicle device 1118 may communicate directly with transportation management system 1102 or through another provider computing device, such as provider computing device 1116. In some embodiments, a requestor computing device (e.g., device 1124) may communicate via a connection 1126 directly with transportation management vehicle device 1118 via a communication channel and/or connection, such as a peer-to-peer connection, Bluetooth connection, NFC connection, ad hoc wireless network, and/or any other communication channel or connection. Although FIG. 11 shows particular devices communicating with transportation management system 1102 over networks 1110 and 1112, in various embodiments, transportation management system 1102 may expose an interface, such as an application programming interface (API) or service provider interface (SPI) to enable various third parties which may serve as an intermediary between end users and transportation management system 1102.

In some embodiments, devices within a vehicle may be interconnected. For example, any combination of the following may be communicatively connected: vehicle 1114, provider computing device 1116, provider tablet 1120, transportation management vehicle device 1118, requestor computing device 1124, requestor tablet 1122, and any other device (e.g., smart watch, smart tags, etc.). For example, transportation management vehicle device 1118 may be communicatively connected to provider computing device 1116 and/or requestor computing device 1124. Transportation management vehicle device 1118 may establish communicative connections, such as connections 1126 and 1128, to those devices via any suitable communication technology, including, e.g., WLAN technologies implementing the IEEE 802.11 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1102 using applications executing on their respective computing devices (e.g., 1116, 1118, 1120, and/or a computing device integrated within vehicle 1114), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1114 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1102. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 12:
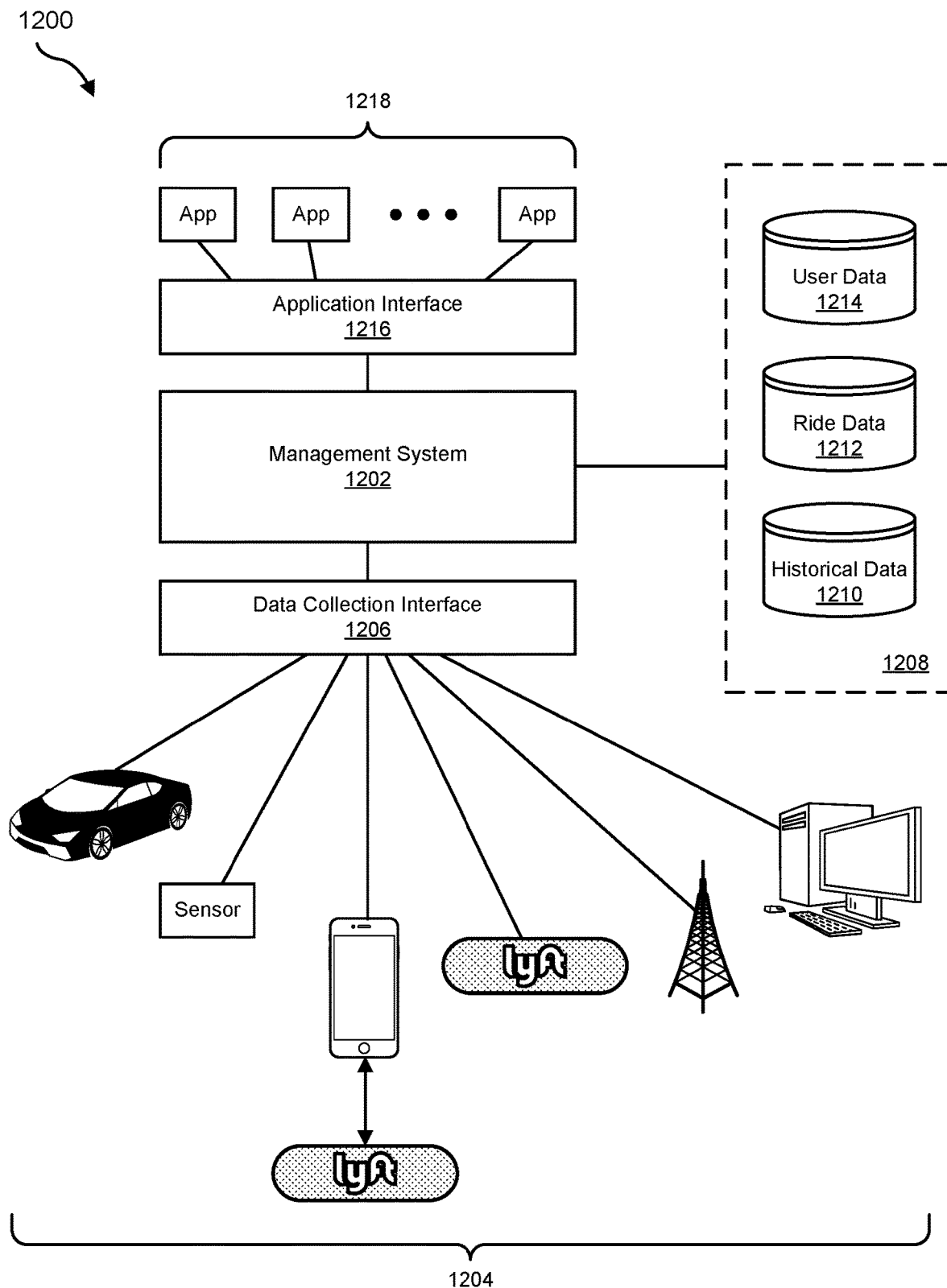
FIG. 12 is an illustration of an example data collection and application management system.

FIG. 12 shows a data collection and application management environment 1200, in accordance with various embodiments. As shown in FIG. 12, management system 1202 may be configured to collect data from various data collection devices 1204 through a data collection interface 1206. As discussed above, management system 1202 may include one or more computers and/or servers or any combination thereof. Data collection devices 1204 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1206 can include, e.g., an extensible device framework configured to support interfaces for each data collection device. In various embodiments, data collection interface 1206 may be extended to support new data collection devices as they are released and/or to update existing interfaces to support changes to existing data collection devices. In various embodiments, data collection devices may communicate with data collection interface 1206 over one or more networks. The networks may include any network or communication protocol as would be recognized by one of ordinary skill in the art, including those networks discussed above.

As shown in FIG. 12, data received from data collection devices 1204 can be stored in data store 1208. Data store 1208 may include one or more data stores, such as databases, object storage systems and services, cloud-based storage services, and other data stores. For example, various data stores may be implemented on a non-transitory storage medium accessible to management system 1202, such as historical data store 1210, ride data store 1212, and user data store 1214. Data stores 1208 can be local to management system 1202, or remote and accessible over a network, such as those networks discussed above or a storage-area network or other networked storage system. In various embodiments, historical data 1210 may include historical traffic data, weather data, request data, road condition data, or any other data for a given region or regions received from various data collection devices. Ride data 1212 may include route data, request data, timing data, and other ride related data, in aggregate and/or by requestor or provider. User data 1214 may include user account data, preferences, location history, and other user-specific data. Although certain data stores are shown by way of example, any data collected and/or stored according to the various embodiments described herein may be stored in data stores 1208.

As shown in FIG. 12, an application interface 1216 can be provided by management system 1202 to enable various apps 1218 to access data and/or services available through management system 1202. Apps 1218 may run on various user devices (including provider and requestor computing devices, such as those discussed above) and/or may include cloud-based or other distributed apps configured to run across various devices (e.g., computers, servers, or combinations thereof). Apps 1218 may include, e.g., aggregation and/or reporting apps which may utilize data 1208 to provide various services (e.g., third-party ride request and management apps). In various embodiments, application interface 1216 can include an API and/or SPI enabling third party development of apps 1218. In some embodiments, application interface 1216 may include a web interface, enabling web-based access to data 1208 and/or services provided by management system 1202. In various embodiments, apps 1218 may run on devices configured to communicate with application interface 1216 over one or more networks. The networks may include any network or communication protocol as would be recognized by one of ordinary skill in the art, including those networks discussed above, in accordance with an embodiment of the present disclosure.

While various embodiments of the present disclosure are described in terms of a ridesharing service in which the ride providers are human drivers operating their own vehicles, in other embodiments, the techniques described herein may also be used in environments in which ride requests are fulfilled using autonomous vehicles. For example, a transportation management system of a ridesharing service may facilitate the fulfillment of ride requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    entering, by a dynamic transportation matching system, a first transport request into a batch of transport requests including a second transport request;
    evaluating, by the dynamic transportation matching system, a fitness of matching the first transport request with the second transport request;
    determining, by the dynamic transportation matching system, an upper bound for an amount of time to monitor the batch of transport requests for potential alternative matchings for the first transport request based on a probability that a requestor associated with the first transport request will cancel the first transport request as a function of time after submitting the first transport request;
    monitoring, by the dynamic transportation matching system, the batch of transport requests in response to determining the upper bound for the amount of time; and
    matching, by the dynamic transportation matching system, a provider with the first transport request and with the second transport request based on the evaluated fitness of matching the first transport request with the second transport request and on a constraint to match the first transport request within the upper bound.

2. The computer-implemented method of claim 1, further comprising determining an elasticity associated with the first transport request that indicates a measure of sensitivity to a cost associated with the first transport request.

3. The computer-implemented method of claim 2, wherein determining the elasticity associated with the first transport request is based on one or more of: historical data of the requestor or historical data of other requestors who are similarly situated to the requestor.

4. The computer-implemented method of claim 2, wherein determining the upper bound for the amount of time to monitor the batch of transport requests for potential alternative matchings for the first transport request is further based on the determined elasticity.

5. The computer-implemented method of claim 1, wherein determining the upper bound for the amount of time to monitor the batch of transport requests for potential alternative matchings for the first transport request is further based on contextual conditions in which the first transport request was submitted.

6. The computer-implemented method of claim 5, wherein the contextual conditions in which the first transport request was submitted comprise one or more of: time of day, weather, or recent transportation requests.

7. The computer-implemented method of claim 1, wherein determining the upper bound for the amount of time to monitor the batch of transport requests for potential alternative matchings for the first transport request is further based on a geographical area to which the first transport request pertains.

8. The computer-implemented method of claim 1, wherein the upper bound for the amount of time to monitor the batch of transport requests for potential alternative matchings for the first transport request varies based on a density of prospective travelers in an area of the first transport request.

9. The computer-implemented method of claim 1, wherein evaluating the fitness of matching the first transport request with the second transport request is based on one or more of expected total travel time, expected total travel distance, fare paid in connection with travel, fare collected in connection with travel, transportation costs, increased transportation density resulting in lower traffic in congested areas, transportation provider distribution, requestor preferences, or travel comfort.

10. The computer-implemented method of claim 1, wherein the fitness of matching the first transport request with the second transport request declines as time spent by the first transport request and the second transport request in the batch of transport requests approaches the upper bound.

11. A system comprising one or more physical processors and one or more memories coupled to the one or more physical processors, the one or more memories comprising instructions operable when executed by the one or more physical processors to cause the system to perform operations comprising:
    entering a first transport request into a batch of transport requests including a second transport request;
    evaluating a fitness of matching the first transport request with the second transport request;
    determining an upper bound for an amount of time to monitor the batch of transport requests for potential alternative matchings for the first transport request based on a probability that a requestor associated with the first transport request will cancel the first transport request as a function of time after submitting the first transport request;
    monitoring the batch of transport requests in response to determining the upper bound for the amount of time; and
    matching a provider with the first transport request and with the second transport request based on the evaluated fitness of matching the first transport request with the second transport request and on a constraint to match the first transport request within the upper bound.

12. The system of claim 11, further comprising instructions operable when executed by the one or more physical processors to cause the system to perform an operation comprising determining an elasticity associated with the first transport request that indicates a measure of sensitivity to a cost associated with the first transport request.

13. The system of claim 12, wherein determining the elasticity associated with the first transport request is based on one or more of: historical data of the requestor or historical data of other requestors who are similarly situated to the requestor.

14. The system of claim 12, wherein determining the upper bound for the amount of time to monitor the batch of transport requests for potential alternative matchings for the first transport request is further based on the determined elasticity.

15. The system of claim 11, wherein determining the upper bound for the amount of time to monitor the batch of transport requests for potential alternative matchings for the first transport request is further based on contextual conditions in which the first transport request was submitted.

16. The system of claim 15, wherein the contextual conditions in which the first transport request was submitted comprise one or more of: time of day, weather, or recent transportation requests.

17. The system of claim 11, wherein determining the upper bound for the amount of time to monitor the batch of transport requests for potential alternative matchings for the first transport request is further based on a geographical area to which the first transport request pertains.

18. The system of claim 11, wherein the upper bound for the amount of time to monitor the batch of transport requests for potential alternative matchings for the first transport request varies based on a density of prospective travelers in an area of the first transport request.

19. The system of claim 11, wherein the fitness of matching the first transport request with the second transport request declines as time spent by the first transport request and the second transport request in the batch of transport requests approaches the upper bound.

20. A non-transitory computer-readable medium comprising computer-readable instructions that, when executed by at least one processor of a computing device, cause the computing device to:
- enter a first transport request into a batch of transport requests including a second transport request;
- evaluate a fitness of matching the first transport request with the second transport request;
- determine an upper bound for an amount of time to monitor the batch of transport requests for potential alternative matchings for the first transport request based on a probability that a requestor associated with the first transport request will cancel the first transport request as a function of time after submitting the first transport request;
- monitor the batch of transport requests in response to determining the upper bound for the amount of time; and
- match a provider with the first transport request and with the second transport request based on the evaluated fitness of matching the first transport request with the second transport request and on a constraint to match the first transport request within the upper bound.

* * * * *